US007895515B1

(12) United States Patent
Oliver et al.

(10) Patent No.: US 7,895,515 B1
(45) Date of Patent: Feb. 22, 2011

(54) DETECTING INDICATORS OF MISLEADING CONTENT IN MARKUP LANGUAGE CODED DOCUMENTS USING THE FORMATTING OF THE DOCUMENT

(75) Inventors: Jonathan James Oliver, Kew (AU); Hsin-Yi Chen, Taipei (TW); Guan-Liang Chen, Taipei (TW); Cheng Hsin Hsu, Taipei (TW)

(73) Assignee: Trend Micro Inc, Tokyo (JP)

( * ) Notice: Subject to any disclaimer, the term of this patent is extended or adjusted under 35 U.S.C. 154(b) by 728 days.

(21) Appl. No.: 11/680,411

(22) Filed: Feb. 28, 2007

(51) Int. Cl.
*G06F 17/00* (2006.01)
(52) U.S. Cl. .............. 715/237; 715/234; 715/236; 715/242
(58) Field of Classification Search .............. 715/200, 715/234, 236, 237, 242, 254, 271
See application file for complete search history.

(56) References Cited

U.S. PATENT DOCUMENTS

| | | | | |
|---|---|---|---|---|
| 5,892,900 | A * | 4/1999 | Ginter et al. .................. | 726/26 |
| 6,516,308 | B1 * | 2/2003 | Cohen .......................... | 706/12 |
| 6,813,725 | B1 | 11/2004 | Hanes et al. | |
| 7,065,483 | B2 * | 6/2006 | Decary et al. .................. | 704/7 |
| 7,437,158 | B2 | 10/2008 | Russell | |
| 7,712,111 | B2 | 5/2010 | Illowsky et al. | |
| 2003/0038971 | A1 * | 2/2003 | Renda ....................... | 358/1.16 |
| 2003/0182310 | A1 * | 9/2003 | Charnock et al. ........ | 707/104.1 |
| 2005/0081059 | A1 * | 4/2005 | Bandini et al. .............. | 713/201 |
| 2006/0053203 | A1 * | 3/2006 | Mijatovic .................... | 709/206 |
| 2006/0168006 | A1 * | 7/2006 | Shannon et al. ............. | 709/206 |
| 2006/0242306 | A1 * | 10/2006 | Boro et al. .................. | 709/227 |
| 2007/0061266 | A1 * | 3/2007 | Moore et al. .................. | 705/51 |
| 2007/0124384 | A1 * | 5/2007 | Howell et al. ............... | 709/206 |
| 2007/0130351 | A1 * | 6/2007 | Alperovitch et al. ........ | 709/229 |
| 2007/0143853 | A1 * | 6/2007 | Tsukamoto .................. | 726/26 |
| 2007/0185858 | A1 * | 8/2007 | Lu et al. ........................ | 707/5 |

OTHER PUBLICATIONS

"U.S. Appl. No. 11/681,671", filed Mar. 2, 2007.
"Non Final Office Action", U.S. Appl. No. 11/681,671, Mailing Date: Jan. 26, 2010.
"Final Office Action", U.S. Appl. No. 11/681,671, Mailing Date: May 27, 2010.
Zoltan, et al., "Spam: It's Not Just for Inboxes Anymore", IEEE Computer Magazine, vol. 38, No. 10, pp. 28-34, Oct. 2005, Washington, DC, 7 pages total.
"Spam in Blogs", Wikipedia, the free encyclopedia, http://en.wikipedia.org/wiki/Spam_in_blogs, printed Jun. 8, 2010, 6 pages total.

\* cited by examiner

*Primary Examiner* — Stephen S. Hong
*Assistant Examiner* — Gregory J. Vaughn
(74) *Attorney, Agent, or Firm* — IP Strategy Group, P.C.

(57) ABSTRACT

A method for detecting indicators of misleading content in a markup language coded document is provided. The method includes extracting a set of tags from the markup language coded document. The method also includes combining tags to create a tag structure signature. The tag structure signature is configured to include a set of n-grams. Each of the set of n-grams includes at least two tags from the set of tags. The method further includes comparing the tag structure signature against a set of known bad tag structure signatures to determine similarity.

20 Claims, 7 Drawing Sheets

```
<!DOCTYPE HTML PUBLIC "-//W3C//DTD HTML 4.0 Transitional//EN">
<HTML><HEAD>
<META HTTP-EQUIV=3D"Content-Type" CONTENT=3D"text/html; charset=
=3Diso-8859-1">
<META content=3D"MSHTML 6.00.2900.2180" name=3DGENERATOR>
<STYLE></STYLE>
</HEAD>
<BODY bgColor=3D#ffffff>
<DIV align=3Dcenter><FONT face=3DArial size=3D2><IMG alt=3D"" hspace=3D0 src=
=3D"cid:007b01c6cede$83f85770$426fc8e8@speedlink.com.au" align=3Dmiddle
<DIV><FONT face=3DArial size=3D2>Hi There</FONT> </DIV>
<DIV><FONT face=3DArial size=3D2>You've got pictures!</FONT></DIV>
<DIV><FONT face=3DArial size=3D2>Goodbye</FONT> </DIV>
</BODY></HTML>
```

FIGURE 2A

| WITH OUT ATTRIBUTE NAMES | |
|---|---|
| Line 01 | <=HTMLSTART> |
| Line 02 | <! > |
| Line 03 | <HTML> |
| Line 04 | <HEAD> |
| Line 05 | <META> |
| Line 06 | <META> |
| Line 07 | <STYLE> |
| Line 08 | </STYLE> |
| Line 09 | </HEAD> |
| Line 10 | <BODY> |
| Line 11 | <DIV> |
| Line 12 | <FONT> |
| Line 13 | <IMGCID> |
| Line 14 | <DIV> |
| Line 15 | <FONT> |
| Line 16 | </FONT> |
| Line 17 | </DIV> |
| Line 18 | <DIV> |
| Line 19 | <FONT> |
| Line 20 | </FONT> |
| Line 21 | </DIV> |
| Line 22 | <DIV> |
| Line 23 | <FONT> |
| Line 24 | </FONT> |
| Line 25 | </DIV> |
| Line 26 | </BODY> |
| Line 27 | </HTML> |

FIGURE 2B

| WITH ATTRIBUTE NAMES | |
|---|---|
| Line 01 | <=HTMLSTART> |
| Line 02 | <! > |
| Line 03 | <HTML> |
| Line 04 | <HEAD> |
| Line 05 | <META HTTP-EQUIV CONTENT> |
| Line 06 | <META content name> |
| Line 07 | <STYLE> |
| Line 08 | </STYLE> |
| Line 09 | </HEAD> |
| Line 10 | <BODY bgColor> |
| Line 11 | <DIV align> |
| Line 12 | <FONT face size> |
| Line 13 | <IMGCID alt hspace src align> |
| Line 14 | <DIV> |
| Line 15 | <FONT face size> |
| Line 16 | </FONT> |
| Line 17 | </DIV> |
| Line 18 | <DIV> |
| Line 19 | <FONT face size> |
| Line 20 | </FONT> |
| Line 21 | </DIV> |
| Line 22 | <DIV> |
| Line 23 | <FONT face size> |
| Line 24 | </FONT> |
| Line 25 | </DIV> |
| Line 26 | </BODY> |
| Line 27 | </HTML> |

FIGURE 2C

| BIGRAM SIGNATURE | | |
|---|---|---|
| Line 01 | =HTMLSTART_! | 1 |
| Line 02 | !_HTML | 1 |
| Line 03 | HTML_HEAD | 1 |
| Line 04 | HEAD_META | 1 |
| Line 05 | META_META | 1 |
| Line 06 | META_STYLE | 1 |
| Line 07 | STYLE_/STYLE | 1 |
| Line 08 | /STYLE_/HEAD | 1 |
| Line 09 | /HEAD_BODY | 1 |
| Line 10 | BODY_DIV | 1 |
| Line 11 | DIV_FONT | 4 |
| Line 12 | FONT_=IMGCID | 1 |
| Line 13 | =IMGCID_DIV | 1 |
| Line 14 | FONT_/FONT | 3 |
| Line 15 | /FONT_/DIV | 3 |
| Line 16 | /DIV_DIV | 2 |
| Line 17 | /DIV_/BODY | 1 |
| Line 18 | /BODY_/HTML | 1 |

FIGURE 2D

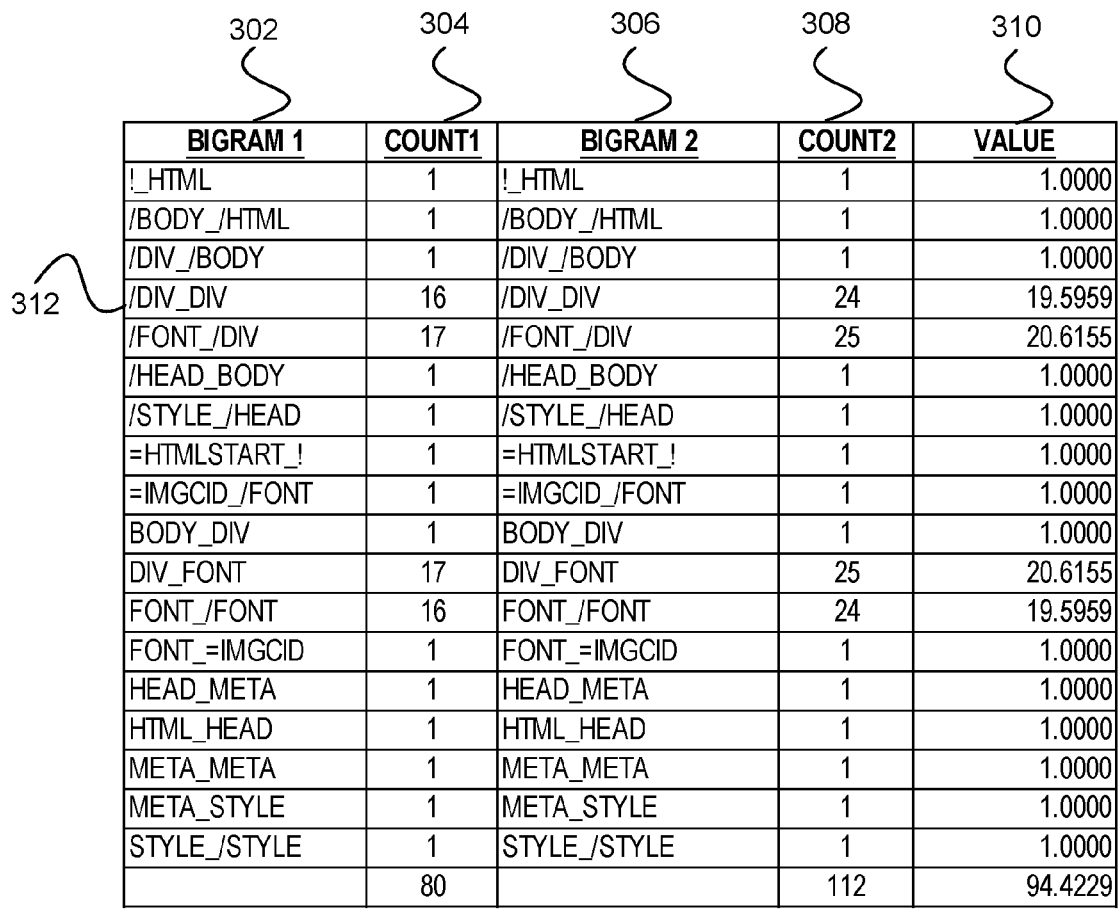

| BIGRAM 1 | COUNT1 | BIGRAM 2 | COUNT2 | VALUE |
|---|---|---|---|---|
| !_HTML | 1 | !_HTML | 1 | 1.0000 |
| /BODY_/HTML | 1 | /BODY_/HTML | 1 | 1.0000 |
| /DIV_/BODY | 1 | /DIV_/BODY | 1 | 1.0000 |
| /DIV_DIV | 16 | /DIV_DIV | 24 | 19.5959 |
| /FONT_/DIV | 17 | /FONT_/DIV | 25 | 20.6155 |
| /HEAD_BODY | 1 | /HEAD_BODY | 1 | 1.0000 |
| /STYLE_/HEAD | 1 | /STYLE_/HEAD | 1 | 1.0000 |
| =HTMLSTART_! | 1 | =HTMLSTART_! | 1 | 1.0000 |
| =IMGCID_/FONT | 1 | =IMGCID_/FONT | 1 | 1.0000 |
| BODY_DIV | 1 | BODY_DIV | 1 | 1.0000 |
| DIV_FONT | 17 | DIV_FONT | 25 | 20.6155 |
| FONT_/FONT | 16 | FONT_/FONT | 24 | 19.5959 |
| FONT_=IMGCID | 1 | FONT_=IMGCID | 1 | 1.0000 |
| HEAD_META | 1 | HEAD_META | 1 | 1.0000 |
| HTML_HEAD | 1 | HTML_HEAD | 1 | 1.0000 |
| META_META | 1 | META_META | 1 | 1.0000 |
| META_STYLE | 1 | META_STYLE | 1 | 1.0000 |
| STYLE_/STYLE | 1 | STYLE_/STYLE | 1 | 1.0000 |
|  | 80 |  | 112 | 94.4229 |

FIGURE 3

DETECTING INDICATORS OF MISLEADING CONTENT IN MARKUP LANGUAGE CODED DOCUMENTS USING THE FORMATTING OF THE DOCUMENT

CROSS REFERENCE TO RELATED APPLICATIONS

The present invention is related to the following application, all of which are incorporated herein by reference:

Commonly assigned application entitled "Grouping of Documents That Contain Markup Language Code," filed on Oct. 4, 2006 by Chen et al. application Ser. No. 11/542,820.

BACKGROUND OF THE INVENTION

The Information Age has been characterized by the explosion of the internet. The phenomenon of the internet has given rise to an increase amount of data being exchanged and shared electronically. With the internet, users have access to potentially endless source of information. Today, information may be exchanged through multiple digital and electronic modes, including but are not limited to emails, blogs, web pages, and the like. However, as the internet provides more connectivity, users have become an easier target for unsolicited information.

Misuse of the internet may come in many forms. Spamming is an example of how the internet may be employed to bombard internet users with unsolicited information. In an example, web advertisers may indiscriminately send unsolicited email messages to unsuspecting email account holders to promote products. Spamming has become a serious problem resulting in unnecessary time and resources being dedicated to blocking and filtering the unsolicited messages.

In an attempt to address spamming, users may implement anti-spam programs. Anti-spam programs may vary in techniques. Some anti-spam programs include blocking the incoming messages. In an example, messages sent from pre-defined web sites known for spamming may be blocked. Anti-spam programs may also employ filtering technique. In other words, the anti-spam programs may have intelligence to automatically analyze the incoming messages to determine whether the incoming messages are spam messages. In an example, content (e.g., specific words, specific phrases, etc.) of an incoming message may be analyzed to determine if the incoming message is actually a spam message. In another example, rules may be established by analyzing a plurality of spam messages to identify patterns.

In general, anti-message programs have produced inconsistent results and may result in a high number of false positives. Some anti-spam programs are unable to catch all spam messages. Other anti-spam programs may unintentionally block legitimate incoming electronic messages. The techniques employed by anti-spam programs may be a time consuming process that may require constant updates. As a result, most anti-spam programs may be unable to anticipate changes to spam attack and usually require time to incorporate the new spam attack technique before releasing the updated anti-spam programs to the general public.

Besides spamming, users may also experience spamdexing. In spamdexing, users of search engines may receive search results that are misleading, such as search results that are unrelated to the search terms/phrases, for example. The search results usually try to rank the web pages in order of relevancy. Due to spamdexing, some of the web pages being displayed with high relevancy may have little or no information related to the search term. Consider the situation wherein, for example, a user wants to search for web sites that offer information about tennis. Due to spamdexing, the search results that may be returned may include web sites that do not pertain to tennis, such as pornographic sites, for example.

Spamdexing may be implemented by different techniques. In an example, spamdexing may include a plethora of words as meta keywords. In another example, spamdexing may include hidden contents. In yet another example, spamdexing may include URL (uniform resource locator) redirection. Although the techniques may vary, the purpose of spamdexing is usually to increase the relevancy of a web site in a search result.

The techniques that may be employed to identify spamdexing may be similar to the anti-spam techniques discussed above. In an example, search engines may analyze the content of the web page to determine if spamdexing has been employed. In another example, search engine may identify patterns among a group of web pages to establish rules about spamdexing. Identifying spamdexing may be a long and tedious process that may require time and resources to identify and update. Thus, search engines have continued to fight an uphill battle in identifying spamdexing and maintaining the relevancy of their search results.

SUMMARY OF INVENTION

The invention relates, in an embodiment, to a method for detecting indicators of misleading content in a markup language coded document. The method includes extracting a set of tags from the markup language coded document. The method also includes combining tags to create a tag structure signature. The tag structure signature is configured to include a set of n-grams. Each of the set of n-grams includes at least two tags from the set of tags. The method further includes comparing the tag structure signature against a set of known bad tag structure signatures to determine similarity.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A shows an example of an HTML document.

FIGS. 2B and 2C shows, in an embodiment, examples of the tags that may be extracted from the HTML document shown in FIG. 2A.

FIG. 2D shows, in an embodiment, an example of a bigram signature.

FIG. 3 shows, in an embodiment of the invention, an example of how a comparison module of classifier module may be employed to compare two bigram signatures.

DETAILED DESCRIPTION OF EMBODIMENTS

Figure 1:
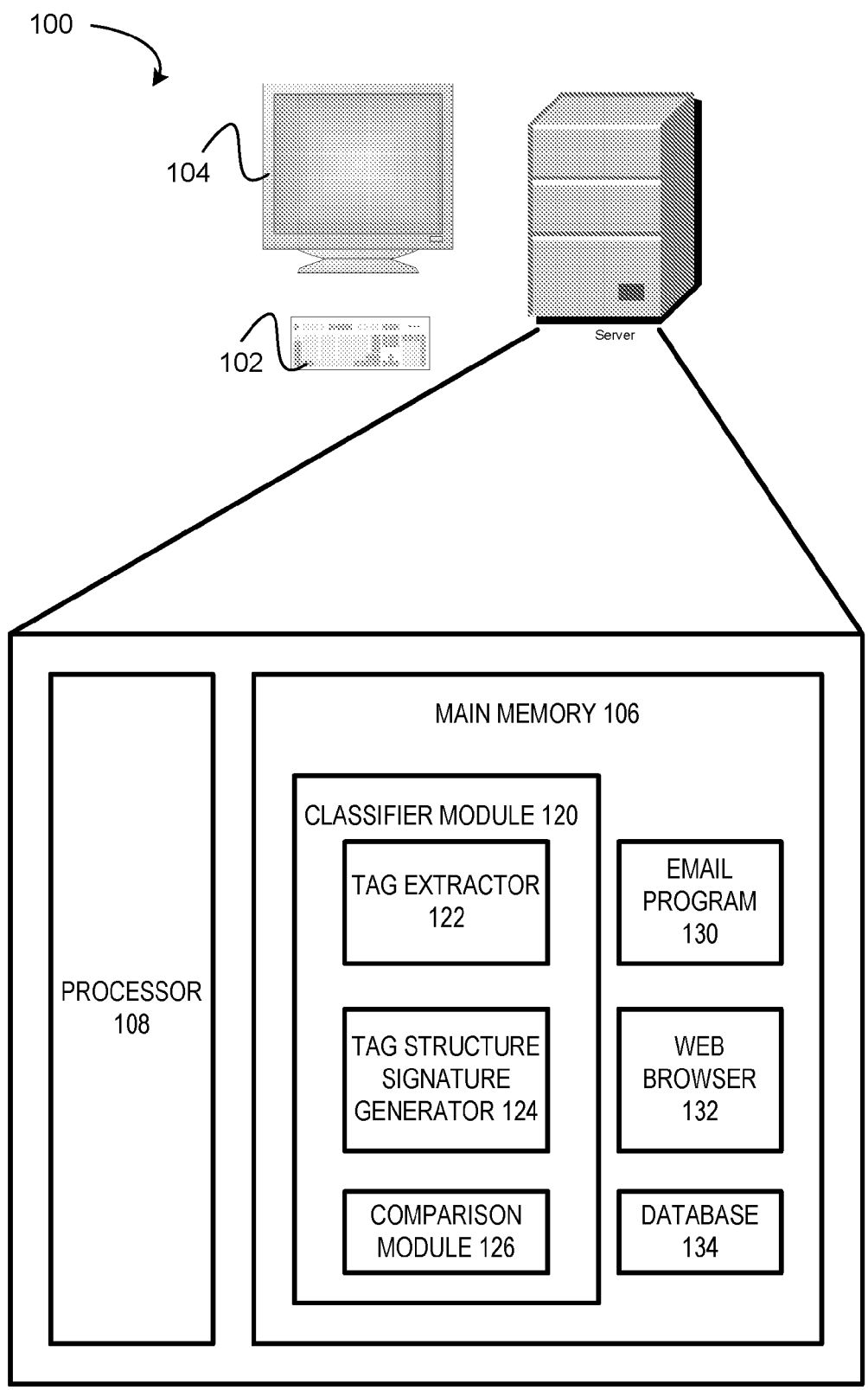
FIG. 1 shows, in an embodiment of the invention, an example of a schematic diagram of a computer.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In one aspect of the invention, the inventors herein realized that besides the content, a markup language coded document (e.g., emails, web pages, blogs, etc.), may also include tags. By extracting the tags, a pattern may be formed. Further, if the tags are combined, a 'signature' pattern may be generated for the markup language coded document. By comparing the 'signature' pattern of two or more markup language coded documents, similarity between the markup language coded documents may be identified. Thus, the inventors realized that if a database of bad 'signature' patterns is generated, spamming and/or spamdexing may be identified by comparing a markup language coded document against the database of 'signature' patterns.

In accordance with embodiments of the present invention, a method is provided for detecting indicators of misleading content, such as inherent spamming and/or spamdexing characteristics, in markup language coded documents. Embodiments of the invention include creating a database of bad tag structure signatures (e.g., bigram signatures, trigram signatures, n-gram signatures, etc.) by analyzing the components (e.g., tags) within markup language coded documents that are suspected of having spamming and/or spamdexing characteristics. Embodiments of the invention also include performing comparisons of markup language coded documents (e.g., emails, web pages, blogs, etc.) against the database of bad tag structure signatures to identify suspected markup language coded documents (e.g., spam documents, web pages with intent to spamdex, etc.).

In this document, various implementations may be discussed using HTML (hyper text markup language) as an example. This invention, however, is not limited to HTML documents and may include any documents with markup languages, including XML (extended markup language) and WML (wireless markup language). Instead, the discussions are meant as examples and the invention is not limited by the examples presented.

Also, in this document, various implementations may be discussed using tags as an example. This invention, however, is not limited to tags and may include any components that may define the structure of a markup language coded document. Instead, the discussions are meant as examples and the invention is not limited by the examples presented.

In an embodiment of the invention, a tag structure signature method for detecting indicators of misleading content, such spamming and/or spamdexing, is provided. The tag structure signature method may include an analysis step and a comparison step. In the analysis step, a tag structure signature is created for a suspected markup language coded document. As discussed herein, a suspected markup language coded document refers to a markup language coded document that may have indicators of misleading content (e.g., inherent spamming and/or spamdexing characteristics). In the comparison step, two or more tag structure signatures are compared against one another to determine whether or not a markup language coded document is a suspected markup language coded document.

Consider the situation wherein, for example, a markup language coded document may include a plurality of tags. Each tag may include a set of attribute names and set of attribute values.

In the analysis step, the tags are extracted from a suspected markup language coded document by a tag extractor. In an embodiment, the tags may be extracted in the order that the tags appeared in the markup language coded document. In an embodiment, the attribute names and values may be stripped from the extracted tags. In another embodiment, the extracted tags may include the set of attribute names.

In an embodiment, the tags may be combined by a tag structure signature generator (e.g., bigram signature generator) to create a tag structure signature. In an embodiment, the tag structure signature may be an n-gram (e.g., bigram, trigram, etc.). In an example, to create an n-gram, such as a bigram (i.e., pair of tags), the first tag may be joined to a consecutive tag. A symbol, such as an '_' (underscore), may be employed to separate the individual tags. Further, the tag structure signature generator may be employed to account for the number of occurrence of the n-grams in the tag structure signature.

Once a tag structure signature has been created, the tag structure signature may be compared against identified bad tag structure signatures. In an embodiment, the bag tag structure signatures may be stored in a centralized database. The centralized database may include the tag structure signatures and the number of time the tag structure signatures have occurred.

In an embodiment, a comparison for an exact match (e.g., hashing) may be performed. In another embodiment, the comparison for a similar match based on a comparison algorithm using the cosine rule, for example, may be performed. If the tag structure signature of the suspected markup language coded document is considered as either an exact match or a similar copy, then the tag structure signature is already part of the centralized database and a counter for the tag structure signature is incremented by one, in an embodiment. However, if a match and/or a similar copy for the tag structure signature of the suspected markup language coded document do not currently exist in the centralized database, then the tag structure signature of the suspected markup language coded document may be added into the centralized database of bad tag structure signatures.

The centralized database of bad tag structure signatures may easily include a large number of tag structure signatures. Instead of releasing the entire centralized database to the general users, only a portion of the centralized database may be made available. The purpose is to reduce time and resources that a user may have to employ to update a local database of bad tag structure signatures. In an embodiment, the bad tag structure signatures that may be made available to a user may be a tag structure signature created by grouping together similar tag structure signatures.

In an embodiment of the invention, the tag structure signature method may also include a comparison step. In the comparison step, a markup language coded document may be compared against a local database of bad tag structure signatures. Before comparison may occur, a tag structure signature may be generated for the markup language coded document.

To compare the tag structure signature against the local database of bad tag structure signatures, a comparison module may be employed. In an embodiment the comparison module may include a comparison algorithm which may be applied in determining the similarity between the tag structure signature of the markup language coded document and bad tag structure signatures in the local database. If the similarity is below a threshold, then the markup language coded document is not considered as a markup language coded document with inherent spamming and/or spamdexing characteristics. However, if the similarity is above a threshold (the markup language coded document is similar to the bad tag structure signatures in the local database), then the markup language coded document is identified as a suspected markup language coded document. In an example, if the markup language coded document is an incoming email, the incoming email will be identified as a spam document. In another example, if the markup language coded document is a web page in a search result, then the markup language coded document may be removed from the list of search results.

The features and advantages of the present invention may be better understood with reference to the figures and discussions that follow.

FIG. 1 shows, in an embodiment of the invention, an example of a schematic diagram of a computer. Consider the situation wherein, for example, a user of a computer 100 employs an input/output device 102 (e.g., mouse, keyboard, etc.) to display emails and web pages on a monitor 104. Computer 100 may include a main memory 106. Main memory 106 may include a classifier module 120, an email program 130, a web browser 132, and a database 134. Computer 100 may also include a processor 108 for executing the computer readable code of classifier module 120, email program 130, and web browser 132.

Classifier module 120 may be configured to identify and group documents with markup language. Classifier module 120 may be implemented in software, hardware, and/or firmware. In an embodiment, classifier module 120 may include a tag extractor 122, a tag structure signature generator 124, and a comparison module 126.

Consider the situation wherein, for example, an HTML (hyper text markup language) document (e.g., email, web pages, etc.) is received by processor 108 of computer 100. In main memory 106, classifier module 120 is employed to analyze the incoming HTML document, shown as HTML document 200 in FIG. 2A.

In an embodiment, tag extractor 122 may be configured to extract tags from an HTML documents. FIG. 2B shows, in an embodiment, an example of the tags that may be extracted from the HTML document shown in FIG. 2A. As can be seen from FIG. 2B, all contents have been eliminated from the HTML document. Unlike the prior art, the present invention focuses on the tags and not the content of the markup language coded document. In an embodiment, the arguments and values from the tags have been removed from the extracted tags. In another embodiment, the extracted tags may include the attribute name but may eliminate the attribute values, as shown in FIG. 2C. In an example, the line 12 of FIG. 2B shows the tag as <FONT> whereas line 12 of FIG. 2C shows the tag as <FONT face size>. In this example, face size is the attribute name of the <FONT> tag.

In an embodiment, the tags may be arranged as an ordered list, with the tags appearing in the order that the tags appeared in the HTML document. The ordered list, in an embodiment, may include a special tag (e.g., <=HTMLSTART>) at the beginning of the ordered list (as shown on line 01 of FIGS. 2B and 2C). In an implementation, the IMG tag, which has a src=CID, may be shown as <IMGCID> in the ordered list (as shown on line 13 of FIGS. 2B and 2C).

The tags extracted from the HTML document by tag extractor 122 may then be employed by tag structure signature generator 124 to create a tag structure signature for the HTML document, in an embodiment. Tag structure signature generator 124 may create the tag structure signature by constructing a plurality tags combinations. In an example, tag structure signature generator 122 may pair up two consecutive tags in creating a tag structure signature, as shown in FIG. 2D.

In creating an n-gram (e.g., bigram), the "<" and the ">" symbols may be dropped from the tag and an "_" may be added between the consecutive tags. In an example, the tags from line 01 and line 02 of FIG. 2B may be paired to form a bigram. Thus, the tags <=HTMLSTART> and <!> may be paired to create bigram "=HTMLSTART_!". The second bigram may be created by taking the tags from line 02 and line 03 of FIG. 2B. Thus, the tags <!> and <HTML> may be paired to create bigram "!_HTML".

In addition to creating the tag structure signature, tag structure signature generator 124 may be employed to provide a count of the occurrence of the n-grams in the HTML documents, as shown by FIG. 2D. In an example, the occurrence of <HTML_HEAD> appears once in the HTML document.

Referring back to FIG. 1, the tag structure signature generated may be employed to identify similar structured documents. To compare two or more HTML documents, comparison module 126 of classifier module 120 may be employed. Comparison module 126 may include computer readable code for comparing two or more HTML documents to determine the similarities between the HTML documents. In an embodiment, comparison module 126 may perform the comparison by comparing the tag structure signature of a first document against the tag structure signature of another document. In an example, the tag structure signature of an incoming web document may be compared against a bad tag structure signature that may be stored in database 134, which may include a plurality of bad tag structure signatures. In an embodiment, comparison module 126 may include a hashing algorithm for determining exact matches between two or more documents. In another embodiment, comparison module may include a cosine rule for identifying similar documents.

FIG. 3 shows, in an embodiment of the invention, an example of how a comparison module of classifier module may be employed to compare two bigram signatures. Consider the situation wherein, for example, an incoming bigram signature 302 is being compared against a bad bigram signature 306. Bigram signature 302 may include a set of bigrams and a count column 304 associated with each pair. Similarly, bigram signature 306 may include a set of bigrams and a count column 308 associated with each pair.

In an embodiment, to determine the similarity between the two bigram signatures, a comparison module may employ a comparison algorithm, such as hashing and/or cosine rule.

Equation 1: bigram value=square root of count of bigram 1×square root of count of bigram 2

Equation 2: total bigram value=sum of all bigram values

Equation 3: Similarity value=total bigram value/((square root (total count for bigram 1))*((square root (total count for bigram 2))

To determine the similarity value between the two bigram signatures, Equations 1-3 above may be utilized, in an embodiment. Equations 1-3 are examples of the plurality of computation methods that may be employed to calculate the similarity value. FIG. 3 will be utilized to illustrate how the three equations may be performed.

First, to calculate the bigram value, Equation 1 may be employed. In an example, the value of the square root of the bigram in bigram signature 302 is multiplied by the square root of the bigram in bigram signature 306. For example, at line 312, the square root of bigram /DIV_DIV is 4 for bigram signature 302 and 4.9 for bigram signature 306. Thus, bigram value 310 for bigram /DIV_DIV, which is 19.5959, is the multiple of these two values.

Then, to calculate the total bigram values for the two bigram signatures, Equation 2 may be employed. In other words, the total bigram value is the sum of all bigram values generated by utilizing Equation 1. In an example, by summing up bigram values 310, a value of 94.4229 may be derived.

Next, a similarity value may be calculated by employing Equation 3. To determine the similarity value, total count for each bigram signature is first computed. In an example, the sum for count column 304 is 80 and the sum for count column 308 is 112.

Then a ratio may be calculated based on the three values—the total count for bigram 1, the total count for bigram 2, and the total bigram value. First, the square root is calculated for each of the total counts. In an example, the square root of 80 (i.e., total count for bigram signature 302) is 8.9443 and the square root of 112 (i.e., total count for bigram signature 306) is 10.5830. The value of the square root for the first total count is then multiplied by the square root of the second total count. In an example, the value of 8.9443 (i.e., square root count value for bigram signature 302) is multiplied by the value of 10.5830 (i.e., square root count value for bigram signature 306) to yield a total count bigram value of 94.6575. To calculate the similarity value, the total bigram value (e.g., 94.229) may be divided by the result calculated from the total count bigram value (e.g., 94.6575) to arrive at a value of 0.9975 or 99.75 percent.

The value may be compared against a threshold value to determine whether or not sufficient similarity exist between the two bigram signatures, in an embodiment. In an example, the threshold may be set at 0.9500. Since the value of 0.9975 is greater than the threshold in this scenario, bigram signature 302 is similar to bigram signature 306.

From a server's perspective, in an embodiment, if the incoming bigram signature has a similarity value less than a threshold than the bigram signature is added to a database of bigram signatures (database 134), which may be located in the main memory or may be located in the classifier module. However, if the similarity value is greater than or equal to a threshold than the number of occurrence for the bigram signature is increased by one.

From a user's perspective, in an embodiment, if the incoming bigram signature has a similarity value greater than a threshold, then the incoming bigram signature is marked as a suspected markup language coded document and is handled accordingly (e.g., user's policy). However, if the incoming bigram signature has a similarity value less than the threshold, then the incoming bigram signature is considered a "good" markup language coded document and the document is allowed to be processed.

Figure 4:
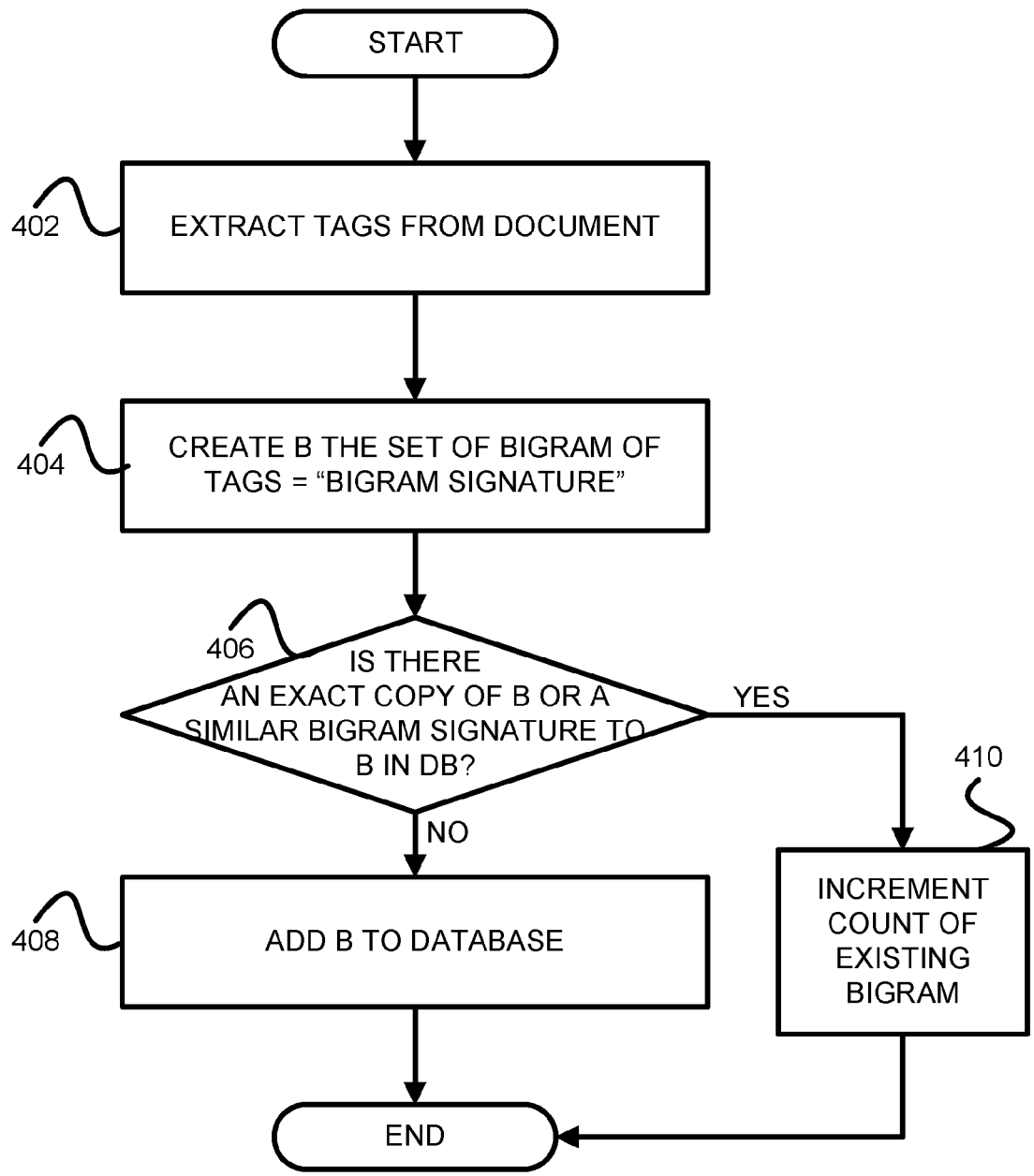
FIG. 4 shows, in an embodiment of the invention, a simple flow chart illustrating a method for creating a bigram signature from a server's perspective.

FIG. 4 shows, in an embodiment of the invention, a simple flow chart illustrating a method for creating a bigram signature from a server's perspective. Consider the situation wherein, for example, an HTML document has been received.

At a first step 402, a tag extractor may be employed to extract the tags from the HTML document.

At a next step 404, a bigram signature generator may be employed to create a bigram signature by pairing consecutive tags. In an embodiment, a bigram signature may include a set of bigrams. Each bigram may be stored as a map, which may include, but are not limited to, the size of the bigram, the number of occurrence in the HTML document, and the like.

At a next step 406, the bigram signature created in step 404 may be compared against another bigram signature. In an embodiment, the bigram signature for the incoming HTML document may be compared against a database of bigram signatures. In an embodiment, a hashing algorithm (e.g., MD5, SHA1, etc.) and/or a comparison algorithm (e.g., cosine rule) may be employed to determine the similarity between two or more bigram signatures.

If an exact copy exists or if similarity exists, then at a next step 410, the count value for the bigram signature may be incremented by one. However, if a match does not exist between the bigram signatures, then at a next step 408, the bigram signature that has just been created for the incoming HTML document may be added to the database of bigram signatures. Steps 408 and 410 enable the method to capture variations in HTML documents and to account for changes in existing bigram signatures. In an embodiment, the bigram signatures stored in the database may be separated into group to generate a bigram pattern that may be released to the end-users.

The steps described in FIG. 4 may be employed to create a centralized database of bad bigram signatures, in an embodiment. In an embodiment, the bigram signature method may include a predictive model for identifying new patterns and accommodating minor modification to the bad bigram signatures. In the prior art, the focus has been on analyzing the content of the markup language coded document. However, anti-spam programs tend to be always one step behind since the anti-spam programs are usually trying to match incoming markup language coded documents against current known spam patterns. Unlike the prior art, the bigram signature method may employ a comparison algorithm to accommodate slight modification to the patterns, thereby predicting new patterns and minimizing the possibility of suspected markup language coded document from being undetected in between updates to the local database of bad bigram signatures.

Figure 5:
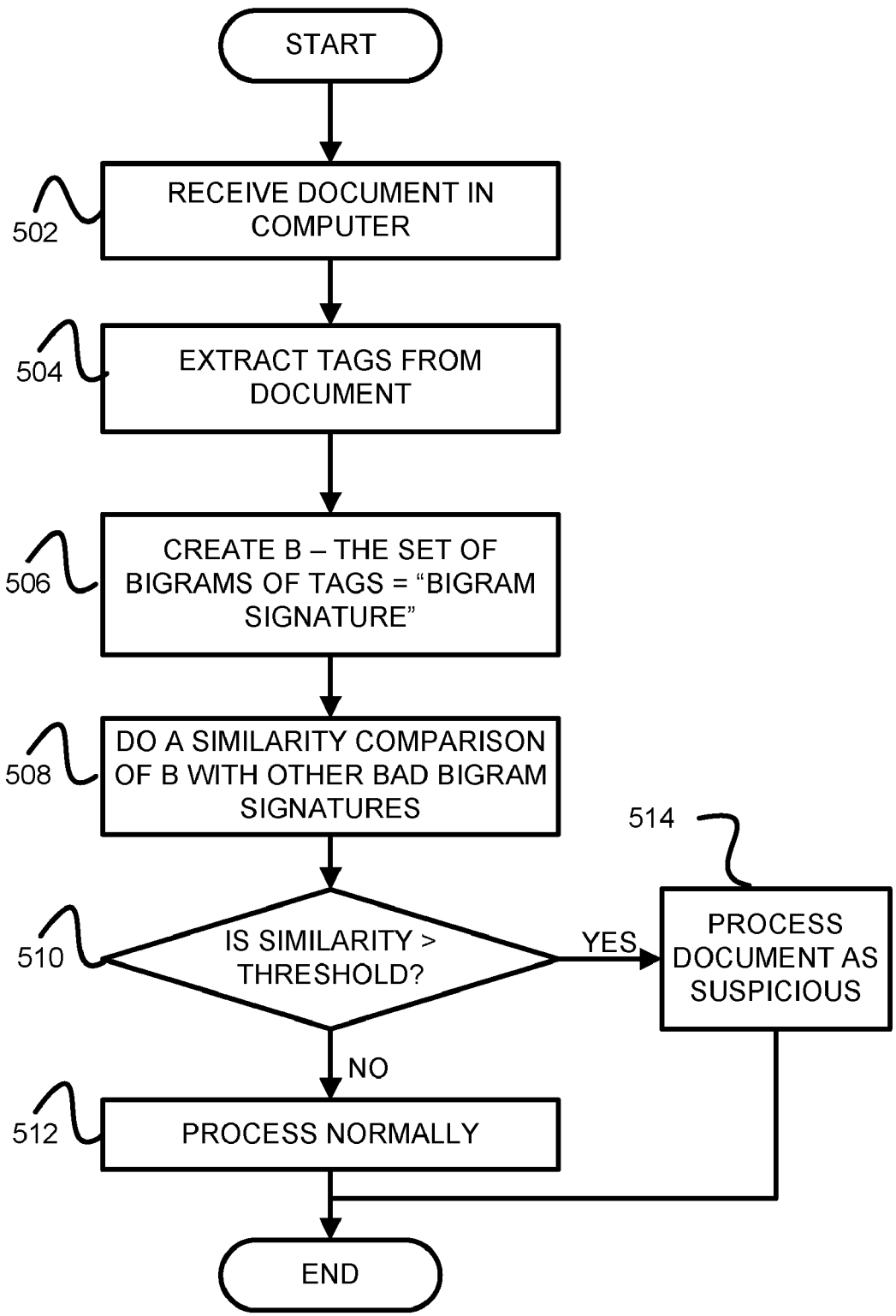
FIG. 5 shows, in an embodiment of the invention, a simple flow chart illustrating a method for performing comparison between two or more bigram signatures from a user's perspective.

FIG. 5 shows, in an embodiment of the invention, a simple flow chart illustrating a method for performing comparison between two or more bigram signatures from a user's perspective.

At a first step 502, an HTML document is received by main memory of a computer.

At a next step 504, a tag extractor may be employed to extract the tags from the HTML documents.

At a next step 506, a bigram signature generator may be employed to create a bigram signature by pairing consecutive tags.

At a next step 508, a comparison module may be employed to perform a similarity comparison between the bigram signature of the incoming HTML document and a set of bad bigram signatures. In an embodiment, a hashing algorithm (e.g., MD5, SHA1, etc.) and/or a comparison algorithm (e.g., cosine rule) may be employed to determine the similarity between two or more bigram signatures.

At a next step 510, the similarity ratio calculated in step 508 may be compared against a threshold. In an embodiment, the threshold value may be predefined. In another embodiment, the threshold may be a dynamic threshold that may account for historical trend.

At a next step 512, if the similarity ratio is below the threshold, then the incoming HTML document is not considered to be a spam document and may be processed as a normal markup language coded document.

However, if at a next step 514, the similarity ratio is above the threshold, then the incoming HTML document is considered as a spam document and may be processed as a suspicious document in accordance with access policy created by the user and/or by firm's policy.

FIGS. 4 and 5 have employed bigrams as examples of tag structures that may be analyzed to determine tag structure similarity between markup language coded documents. However, the invention is not limited to analysis of bigram signatures and may include other methods for determining tag structure similarity, such as analysis of n-gram of tags and principal component analysis.

In an embodiment, the markup language (e.g., tags, attribute values, attribute names, etc.) of a markup language coded document are defined as features. The features may be extracted to create a dataset of features. By employing principal components analysis, the dimensionality of the dataset of features may be reduced. By employing a comparison algorithm, the similarity between two or more datasets of features may be determined. Those skilled in the art are familiar with principal components analysis and no further discussion will be provided.

As can be appreciated from the forgoing, one or more embodiments of the present invention provided for a tag structure signature method for identifying suspected markup language coded documents. With the present invention, attempts to elude detection by making minor modifications to the format of a suspected markup language coded document may be identified since the tag structure signature method is a predictive model capable of accounting for slight variation in patterns. Also, the number of false positives may be substantially reduced since the tag structure signature method applies a comparison algorithm limited by a threshold to determine a match. Thus, the tag structure signature method is a powerful and versatile method capable of accommodating pattern changes that may occur between updates to the local database of bad tag structure signatures.

While this invention has been described in terms of several preferred embodiments, there are alterations, permutations, and equivalents, which fall within the scope of this invention. Also, the title, summary, and abstract are provided herein for convenience and should not be used to construe the scope of the claims herein. It should also be noted that there are many alternative ways of implementing the methods and apparatuses of the present invention. Although various examples are provided herein, it is intended that these examples be illustrative and not limiting with respect to the invention. Further, in this application, a set of "n" items refers zero or more items in the set. It is therefore intended that the following appended claims be interpreted as including all such alterations, permutations, and equivalents as fall within the true spirit and scope of the present invention.

What is claimed is:

1. A method for detecting indicators of misleading content in a markup language coded document, said method being implemented using a computer, said method comprising:
    extracting a set of tags from said markup language coded document, said set of tags having been included in said markup language coded document before said markup language coded document is received by said computer;
    combining tags of said set of tags to create a tag structure signature, said tag structure signature being configured to include a set of n-grams, each n-gram of said set of n-grams including at least two tags from said set of tags;
    removing attribute values from said tags of said set of tags before performing said combining; and
    comparing said tag structure signature against a set of known tag structure signatures to determine similarity.

2. The method of claim 1 wherein said set of n-grams includes at least a first n-gram and a second n-gram, said first n-gram including at least a first tag and a second tag, said second n-gram including at least said second tag and a third tag.

3. The method of claim 1 further comprising adding a copy of a symbol between any two tags in said each n-gram of said set of n-grams.

4. The method of claim 1 wherein said n-gram signature is a bigram signature.

5. The method of claim 1 further comprising removing attribute names from said tags of said set of tags before performing said combining.

6. The method of claim 1 wherein said comparing including using a hashing algorithm.

7. The method of claim 1 further comprising removing copies of a "<" symbol from said tags of said set of tags before performing said combining.

8. The method of claim 1 further comprising:
    adding said tag structure signature to a central database if said tag structure signature and said set of known tag structure signatures are dissimilar;
    separating said central database into groups of tag structure signatures, each group of said groups of tag structure signatures representing a set of tag structure signatures with similar features, wherein said each group of said groups of tag structure signatures is configured to generate a new tag structure signature; and
    updating a local database of a local computer with at least a portion of said central database.

9. The method of claim 1 further comprising storing the size of said each n-gram of said set of n-grams.

10. A computer-implemented arrangement within memory of a computer system for detecting indicators of misleading content in a markup language coded document, said computer-implemented arrangement comprising:
    a classifier module, said classifier module being configured to identify and group documents with markup language, wherein said classifier module including
        a tag extractor, said tag extractor being configured to extract a set of tags from said markup language coded document, said set of tags having been included in said markup language coded document before said markup language coded document is received by said computer system,
        a tag structure signature generator, said tag structure signature generator being configured to create a tag structure signature by combining tags of said set of tags, said tag structure signature being an n-gram signature including a set of n-grams, each n-gram of said set of n-grams including at least two tags from said set of tags, said tag structure signature generator being further configured to add a copy of a symbol between any two tags in said each n-gram of said set of n-grams, and a comparison module, said comparison module being configured to calculated a similarity value between said tag structure signature and a set known tag structure signatures.

11. The computer-implemented arrangement of claim 10 wherein said comparison module includes a hashing algorithm.

12. The computer-implemented arrangement of claim 10 wherein said tag structure signature generator is further configured to remove attribute values from said tags of said set of tags before combining said tags of said set of tags.

13. The computer-implemented arrangement of claim 10 wherein a central database is updated with said tag structure signature if said tag structure signature is dissimilar to said set of known tag structure signatures.

14. The computer-implemented arrangement of claim 13 wherein said central database is divided into groups of tag structure signatures, each group of said groups of tag structure signatures representing a set of tag structure signatures with similar features, wherein said each group of said groups of tag structure signatures is configured to generate a new tag structure signature.

15. The computer-implemented of claim 10 wherein said tag structure signature generator is further configured to remove attribute names from said tags of said set of tags before combining said tags of said set of tags.

16. An article of manufacture comprising a program storage medium having computer readable code embodied therein, said computer readable code being configured for detecting indicators of misleading content in a markup language coded document that is received by a computer, said article of manufacture comprising:

computer readable code for extracting a set of tags from said markup language coded document, wherein a tag extractor is employed to perform said computer readable code for extracting said set of tags, said set of tags having been included in said markup language coded document before said markup language coded document is received by said computer;

computer readable code for combining tags of said set of tags to create a tag structure signature, wherein a tag structure signature generator is employed to perform said computer readable code for combining said tags, said tag structure signature being configured to include a set of n-grams, each of said set of n-grams including at least two tags from said set of tags;

computer readable code for removing attribute values from said tags of said set of tags before said tags of said set of tags are combined to create said tag structure signature; and computer readable code for comparing said tag structure signature against a set of known tag structure signatures to determine similarity, wherein a comparison module is employed to perform said computer readable code for comparing between said tag structure signature and said set of known structure signatures.

17. The article of manufacture of claim 16 wherein said n-gram signature is a bigram signature.

18. The article of manufacture of claim 16 further comprising computer readable code for adding said tag structure signature to a central database if said tag structure signature and said set of known tag structure signatures is dissimilar; and computer readable code for separating said central database into groups of tag structure signatures, each group of said groups of tag structure signatures representing a set of tag structure signatures with similar features, wherein said each group of said groups of tag structure signatures is configured to generate a new tag structure signature.

19. The article of manufacture of claim 16 further comprising computer readable code for removing attribute names from said tags of said set of tags before said tags of said set of tags are combined to create said tag structure signature.

20. The article of manufacture of claim 16 further comprising computer readable code for adding a copy of a symbol between any two tags in said each n-gram of said set of n-grams.

* * * * *